United States Patent
Schaller

(10) Patent No.: US 7,646,424 B2
(45) Date of Patent: Jan. 12, 2010

(54) CAMERA SUPPORT DEVICE WORN ON THE BODY COMPRISING A MULTIFUNCTIONAL ASSEMBLY OF ELECTRICAL COMPONENTS

(75) Inventor: Curt O. Schaller, Munich (DE)

(73) Assignee: Camera Dynamics GmbH, Eching (DE)

( * ) Notice: Subject to any disclaimer, the term of this patent is extended or adjusted under 35 U.S.C. 154(b) by 607 days.

(21) Appl. No.: 10/489,390

(22) PCT Filed: Sep. 12, 2002

(86) PCT No.: PCT/EP02/10244

§ 371 (c)(1),
(2), (4) Date: Sep. 30, 2004

(87) PCT Pub. No.: WO03/024093

PCT Pub. Date: Mar. 20, 2003

(65) Prior Publication Data

US 2005/0041108 A1    Feb. 24, 2005

(30) Foreign Application Priority Data

Sep. 13, 2001    (DE) ................................ 101 45 193

(51) Int. Cl.
*H04N 5/225* (2006.01)
*G03B 17/00* (2006.01)

(52) U.S. Cl. ........................ 348/373; 346/376; 396/419; 396/420; 396/422; 396/428

(58) Field of Classification Search ................ 348/373, 348/376, 375, 722; 352/243; 396/419, 420, 396/422, 424, 428; D16/242, 243; 248/187.1
See application file for complete search history.

(56) References Cited

U.S. PATENT DOCUMENTS

| 4,017,168 | A | * | 4/1977 | Brown | 352/243 |
| 4,083,480 | A | * | 4/1978 | Lee et al. | 224/185 |
| 4,158,490 | A | * | 6/1979 | Gottschalk et al. | 352/243 |
| 4,206,983 | A | * | 6/1980 | Nettman et al. | 352/243 |
| 4,298,149 | A | * | 11/1981 | Gottschalk et al. | 224/201 |
| 4,474,439 | A | * | 10/1984 | Brown | 352/243 |
| 4,672,436 | A | * | 6/1987 | Hawthorne | 348/341 |
| 4,946,272 | A | * | 8/1990 | Brown | 352/243 |
| 4,976,387 | A | | 12/1990 | Spianti | |
| 4,991,758 | A | * | 2/1991 | Eaneff | 224/625 |

(Continued)

FOREIGN PATENT DOCUMENTS

DE    3504362 C1    6/1986

(Continued)

*Primary Examiner*—Sinh Tran
*Assistant Examiner*—Richard M Bemben
(74) *Attorney, Agent, or Firm*—Wolf, Greenfield & Sacks, P.C.

(57) ABSTRACT

The invention relates to a camera support device worn on the body comprising a multifunctional assembly of electrical components. The inventive device is characterized in that an operational mode switch device is used to switch the operational mode of connection devices and signal lines between a first and a second mode. In the first mode, the signal lines are used for transmitting a video signal of a first type. In the second mode, only a part of the signal lines is used for transmitting a video signal of a second type while the remaining signal lines are used for other purposes.

11 Claims, 2 Drawing Sheets

U.S. PATENT DOCUMENTS

Figure 1:
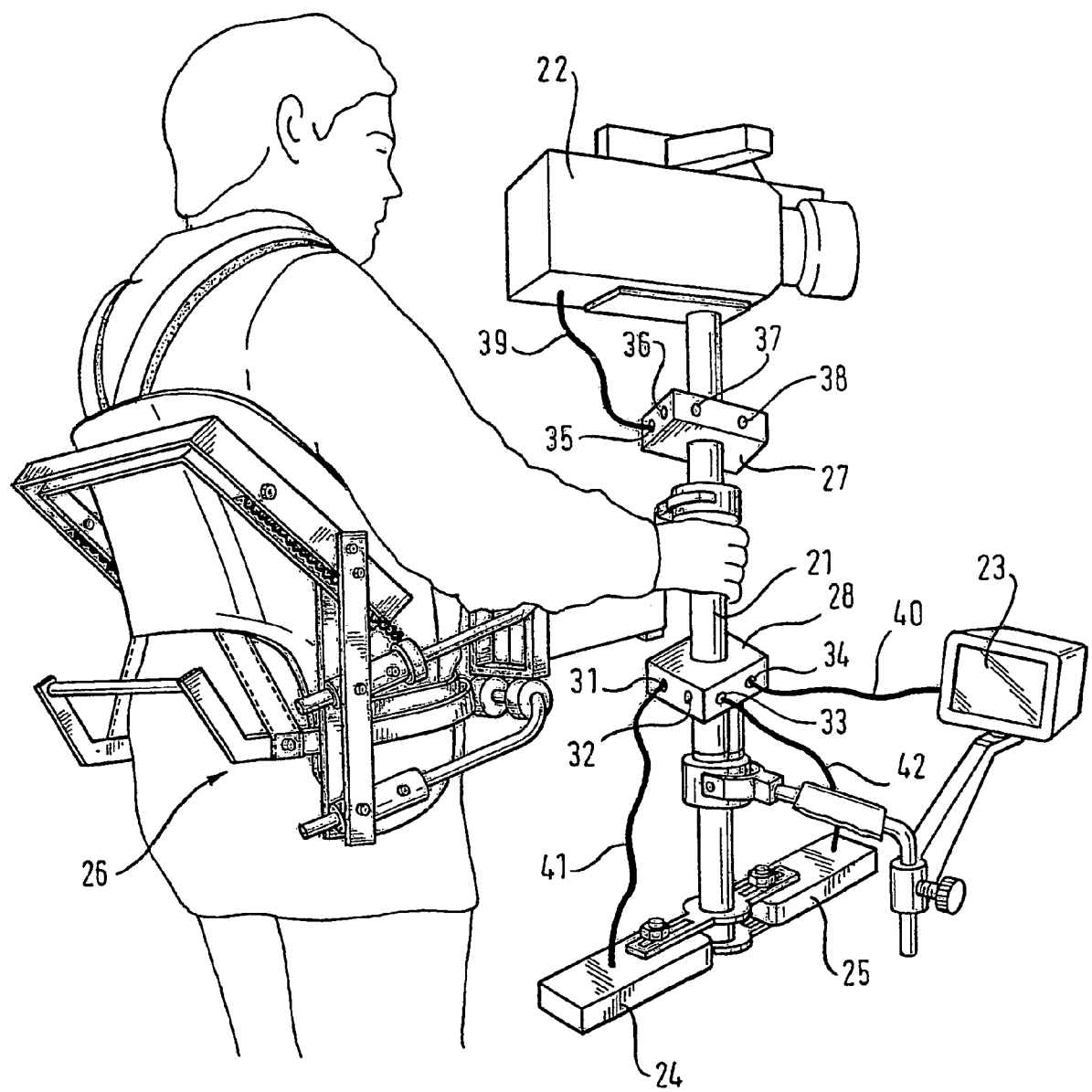

| | | | |
|---|---|---|---|
| 5,065,249 A * | 11/1991 | Horn et al. | 348/376 |
| D329,449 S * | 9/1992 | Brown et al. | D16/243 |
| 5,323,195 A * | 6/1994 | Phillips | 396/422 |
| 5,360,196 A * | 11/1994 | DiGiulio et al. | 248/576 |
| D358,832 S * | 5/1995 | Lenney et al. | D16/242 |
| 5,462,214 A * | 10/1995 | Buswell | 224/679 |
| 5,749,010 A * | 5/1998 | McCumber | 396/420 |
| 5,821,995 A * | 10/1998 | Nisikawa | 348/211.5 |
| 6,215,781 B1 * | 4/2001 | Kato et al. | 370/345 |
| 6,437,834 B1 * | 8/2002 | Tagami | 348/705 |
| 6,530,702 B2 * | 3/2003 | Harris | 396/420 |
| 6,538,732 B1 * | 3/2003 | Drost et al. | 356/241.1 |
| 6,563,532 B1 * | 5/2003 | Strub et al. | 348/158 |
| 6,956,614 B1 * | 10/2005 | Quintana et al. | 348/373 |
| 7,009,698 B2 * | 3/2006 | Drost et al. | 356/241.1 |
| 2002/0012050 A1 * | 1/2002 | Oka et al. | 348/211 |
| 2002/0097333 A1 * | 7/2002 | Wechsler et al. | 348/373 |
| 2003/0011685 A1 * | 1/2003 | Oka et al. | 348/211.2 |
| 2003/0133034 A1 * | 7/2003 | Takahashi | 348/345 |

FOREIGN PATENT DOCUMENTS

| | | |
|---|---|---|
| DE | 69405097 T2 | 11/1994 |
| EP | 0360268 A2 | 3/1990 |
| GB | 2170879 A | 8/1986 |
| JP | 04264887 A | 9/1992 |
| JP | 05207338 A | 8/1993 |
| JP | 2000 050157 A | 2/2000 |
| JP | 2003-510330 | 3/2003 |
| JP | 2003-513982 | 5/2003 |
| JP | 2003-516439 | 5/2003 |
| WO | WO 88/06695 A1 | 9/1988 |
| WO | WO 94/07180 | 3/1994 |
| WO | WO 94/09180 A1 | 4/1994 |
| WO | WO 94/27084 A1 | 11/1994 |
| WO | WO 03/023061 A2 | 3/2003 |
| WO | WO 03/023272 A1 | 3/2003 |
| WO | WO 03/023273 A1 | 3/2003 |
| WO | WO 03/023274 A1 | 3/2003 |
| WO | WO 03/023544 A2 | 3/2003 |

* cited by examiner

CAMERA SUPPORT DEVICE WORN ON THE BODY COMPRISING A MULTIFUNCTIONAL ASSEMBLY OF ELECTRICAL COMPONENTS

TECHNICAL FIELD

The present invention relates to a camera support device worn on the body comprising a multifunctional assembly of electrical components.

Camera support devices worn on the body are known and described for example in EP 0 316 370 A1. These camera support devices enable cameras, peripheral devices and the batteries required for the power supply to be carried by the camera operator and to be held stable independently of the movements of the camera operator. To connect the camera, the peripheral devices and the power supply, usually numerous connectors and cabling are provided to establish the required connections without the work of the camera operator being impeded.

With the known camera support devices, as a rule, only one analog video signal and the power supply are transmitted via the cabling provided in or on the camera support device. The number of peripheral devices is also limited in view of the complexity of the cabling.

As a consequence, the flexibility achieved with the known systems is low.

Against this background, the invention describes a camera support device worn on the body comprising a multifunctional assembly of electrical components, namely: at least a first connection device for feeding a video signal from a camera by cable, at least a second connection device for feeding a video signal to a peripheral device, for example a monitor, a video recording device and/or a transmitting device for video signals, several signal lines for the transmission of the video signals between the connecting devices and at least one operational mode switching device for switching the operational mode of the connecting devices and the signal lines, whereby in a first operational mode the several signal lines may be used for the transmission of a video signal of a first type, for example a high-definition video signal (HDTV) and whereby in a second operational mode part of the several signal lines may be used for the transmission of a video signal of a second type, for example a low-definition (analog) or digital (SDI) video signal, and the remaining part of the several signal lines may be used for other purposes.

This design of the assembly of electrical components will also enable the signal lines required for high-definition video signals to be used in a useful way even when the camera support device according to the invention is used with an analog or digital camera.

This means that both high-definition cameras and analog and digital cameras may be used on the camera support device according to the invention with the same cabling and the existing connection ports. The connectors are configured accordingly and the required signal lines are present. If some signal lines are not required for the transmission of video signals, according to the invention these lines are available for other purposes and are used accordingly in another way. This means that the camera support device according to the invention is more flexible than the known systems without presenting greater, and in some applications unused, complexity.

In addition, a camera support device worn on the body is described in which at least two connecting devices are connected to at least one additional signal line so that a sensor device may be connected by cable to one of the two connecting devices and a signal transmitting device may be connected by cable to the other of the two connecting devices.

Here, the connection is established by means of the signal line in such a way that it may be used via the connecting devices but without the function or the usage of the connecting devices provided for other purposes being disrupted.

This achievement of this design is that in cases when the connecting devices are not used, a different use of the connecting device in addition to its main function is facilitated. For example, the signal from a tally sensor, the output signal of which indicates the illumination of the tally light in a camera, and the control signal for a tally signal transmitter, for example a tally LED, may be transmitted in this way over existing connection ports supplemented by an additional connection for the additional signal line—of course, as a rule only if the connection ports are not being used for their main function.

Figure 2:
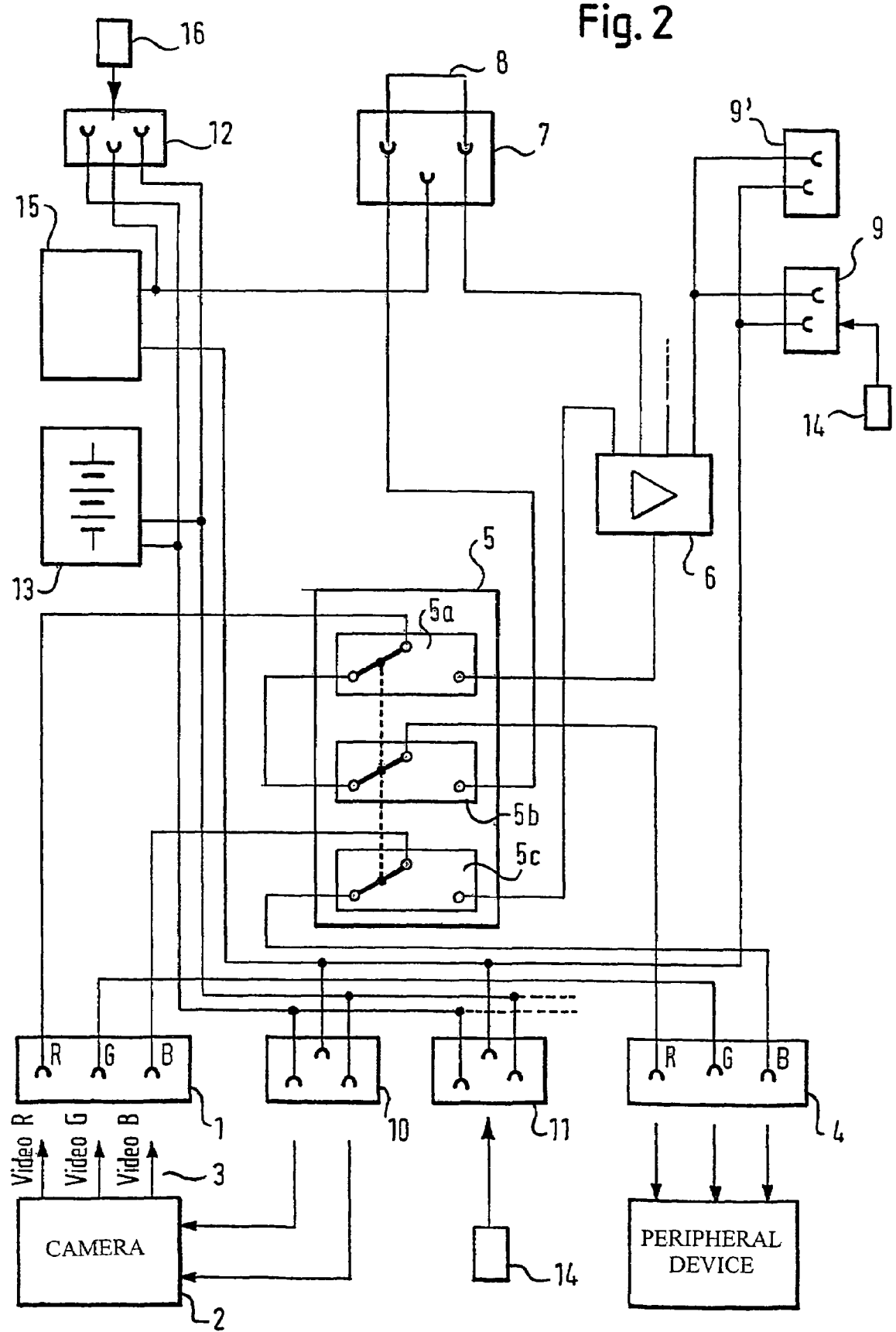

The invention will be further described in the following with reference to an example of an embodiment as shown in the drawings. These show:

FIG. 1 a basic representation of the construction of a camera support device worn on the body, and FIG. 2 the assembly of electrical components in the camera support device according to the invention.

FIG. 1 shows the construction of a camera support device worn on the body in which according to the invention a multifunctional assembly of electrical components may be provided. Attached to a holder 21 are for example a camera 22, a monitor 23 and batteries 24 and 25. The holding tube is connected to a carrying structure 26 with which the camera operator carries the camera support device worn on the body. Also provided on the holding tube 21 are connection casings 27 and 28 on which connection ports 31 to 38 are arranged. These connection ports offer the option of connecting electrical (video) connection cables 39 and 40 or electrical power supply cables 41 and 42 from the camera, the monitor and the batteries. Other peripheral devices, for example video recording devices or transmitting devices for video signals with corresponding connection cables may also be connected to the connection ports. Signal and power supply lines run between ports 31 to 38 mostly in the interior of the tube 21. In addition, electrical components may be accommodated in the holding tube 21 and/or the connection casings 27 and 28. Together, these form an assembly of electrical components which will be described in more detail in the following.

FIG. 2 shows the assembly of electrical components for the camera support device worn on the body according to the invention.

According to the invention, a first connecting device 1 is provided for the cable transmission of a video signal from a camera 2. The video signal, which is fed from the camera 2 by means of a suitable connection cable 3 to the first connecting device 1, may be a high-definition or low-definition (analog) video signal. Conventionally, three signal lines are required for high-definition video signals (HDTV). On the other hand, conventionally only one signal line is used for a low-definition (analog) video signal. In addition, other video signals for example digital video signals (SDI) may be fed via one or more video signal lines, which are fed to the first connecting device 1 from the camera 2 via the connection cable 3.

FIG. 2 also shows a second connecting device 4 for the cable transmission of a video signal to a peripheral device. For the peripheral device, the video signal supplied may again be a high-definition, a low-definition (analog) or a digital video signal so that a corresponding number of signal lines is required. Peripheral devices are for example monitors, video recording devices or video signal transmitting devices.

As may be seen in FIG. 2, several signal lines R, G, B are provided for the transmission of the video signals between the connecting devices 1 and 4. Sometimes, the video signals are transmitted via a continuous signal line from the first connecting device 1 to the second connecting device 2 as is shown for example for the signal line G and sometimes also through several sections of the signal lines as is shown for signal lines R and B.

According to the invention, in addition a operational mode switching device 5 is provided which switches the assembly of electrical components in the camera support device according to the invention between two operational modes. In a first operational mode, for which the switch position of the switching device 5 is shown, the several signal lines R, G and B are used for the transmission of a high-definition video signal (HDTV). This means that the video signal VideoR from camera 2 is transmitted via the signal line R and hence through a first switch unit 5*a* and a second switch unit 5*b* to the second connection unit 4. The video signal VideoB from the camera 2 is transmitted via the signal line B and hence over the switch unit 5*c* to the second connection unit 4. As already mentioned, the signal line G establishes a direct connection between the first connecting device 1 and the second connecting device 4 so that the transmission of the video signal G from the camera 2 is guaranteed. This means that in the first operational mode, all video signals VideoR, VideoG and VideoB from a high-definition video camera 2 are transmitted from the first connecting device 1 to the second connecting device 4.

If the operational mode switching device 5 is switched from the first switch position shown in FIG. 2 to the second switch setting which is not shown in FIG. 2 but may also be understood from FIG. 2, the assembly of electrical components in the camera support device according to the invention may be used for low-definition (analog) video signals, digital or other video signals and other signals. The low-definition (analog) video signal from the camera 2 is fed to the signal line R via the first connecting device 1 and passes through the first switch unit 5*a* and other components, which will be described in more detail in the following, to the second connecting device 4. However, first the video signal is fed from the first switch unit 5*a* to a video amplifier/multiplexer 6 which amplifies the video signal supplied and divides it between several outputs. The video signal from a first output from the video amplifier/multiplexer 6 is fed to a third connecting device 7 for supplying video signals to peripheral devices. A video signal from the peripheral device can be fed from the third connecting device 7 through the second switch unit 5*b* to the second connecting device 4. If no peripheral device is connected to the third connecting device 7, the video signal from the first output from the video amplifier/multiplexer 6 is transmitted through a bridge 8, through the second switch unit 5*b* to the second connecting device 4. However, instead of the bridge 8, any peripheral device for processing/changing the video signal fed from the first output from the video amplifier/multiplexer 6 in the third connecting device 7 may be connected so that then a video signal changed/processed by the peripheral device goes from the third connecting device 7 through the second switch unit 5*b* to the second connecting device 4.

The video signal from a second output from the video amplifier/multiplexer 6 is fed to a fourth connecting device 9 for feeding a video signal by cable to a peripheral device. In this way, another peripheral device in addition to the peripheral devices connected to the second and third connecting units may be connected to the assembly of electrical components in the camera support device according to the invention. Depending upon the number of outputs from the video amplifier/multiplexer 6, additional connecting devices for peripheral devices may be provided.

According to the invention, the signal line B in the second operational mode is used to transmit a video signal from a third output from the video amplifier/multiplexer 6 through the third switch unit 5*c* to the first connecting device 1.

In order to supply the camera and/or peripheral devices with power, the assembly of electrical components according to the invention preferably comprises further connecting devices 10, 11 and 12 which are connected to an electrical power supply unit 13 comprising one or more rechargeable batteries and which provides connections to a power supply for the camera and the peripheral devices. As shown in FIG. 2, the other connecting devices can provide the same operating voltage or facilitate different operating voltages to supply the camera or peripheral devices.

According to another embodiment, in at least one of the connecting devices an additional signal line is provided which offers in addition to the standard equipment of the connecting device, and without impeding this equipment, a sensor device 14. In FIG. 2, the sensor device 14 is shown by way of example next to both the fourth connecting device 9 and the other connecting device 11. In the example of an embodiment shown in FIG. 2, the signal from the sensor device 14 is transmitted over a signal line to an evaluation device 15 which is connected by another signal line to the connecting devices 7 and 12. Once again, the provision of the signal from the evaluation unit 15 is in addition to the standard equipment of the connecting devices 7 and 12. A signal transmitter device 16 may be connected to one of the connecting devices—in FIG. 2 this is shown by way of example next to connecting device 12.

In this way, with the assembly of electrical components in a camera support device according to the invention, the status of a tally signaling light in the camera may be determined by a sensor 14 and transmitted via the additional signal line to a signal transmitter 16. In this way, the state of illumination of the tally signal display, which is often not visible to the camera operator, is transmitted to another signal transmitter and can be provided at a position in the camera support device which can be more easily seen by the camera operator.

If the sensor device is suitably embodied, it is possible to dispense with the evaluation unit 15 so that a single additional signal line between the connecting devices has to be provided in order to facilitate the connection of the sensor and the signal transmitter.

According to the invention, preferably at least individual connecting devices are provided in duplicate so that two connection ports are provided for one connection function. In FIG. 2 this embodiment is shown by way of example for the fourth connecting device 9 which is also provided as a fifth connecting device 9'. By a suitable spatial arrangement of the duplicate connection ports, for example in the connection boxes 27 and 28 shown in FIG. 1, short cables may be used to establish a connection according to the main function on one of the connection ports, ie to connect a peripheral device, and to enable the other connection port to be used for an auxiliary function.

The invention claimed is:

1. Camera support device worn on the body comprising a multifunctional assembly of electrical components comprising:
    at least one set of several signal lines (R, G, B) for transmission of signals between connecting devices (1, 4);
    at least one first connecting device (1) for feeding a video signal by cable from a camera (2) to the set of several signal lines;

at least one second connecting device (4) for feeding a video signal from the set of several signal lines by cable to a peripheral device;

at least one transmitting mode switching device (5, 5a, 5b, 5c) for switching the transmitting mode of the connecting devices (1, 4) and the signal lines (R, G, B);

whereby in a first transmitting mode, all signal lines of the at least one set can be used for the transmission of a video signal of a first type HDTV; and whereby in a second transmitting mode, a part of the signal lines of the at least one set are used for the transmission of a video signal of a second type and the remaining part of the signal lines of the at least one set are available for a purpose other than transmission of the video signal of the second type.

2. Camera support device according to claim 1, wherein in the first transmitting mode the several signal lines establish a connection between the first connecting device and the second connecting device.

3. Camera support device according to claim 1, wherein a third connecting device is provided to feed a video signal by cable to a peripheral device to which in the second transmitting mode the video signal from one signal line of the several signal lines is fed and from which a video signal from the peripheral device is fed to the second connecting device.

4. Camera support device according to claim 1, wherein in the second transmitting mode the video signal from one signal line of the several signal lines is fed to an input to a video amplifier/multiplexer device, the video signal from a first output from the video amplifier/multiplexer device is fed to the second connecting device, and the video signal from a second output from the video amplifier/multiplexer device is fed to a fourth connecting device for feeding a video signal by cable to a peripheral device.

5. Camera support device according to claim 4, wherein the video signal from the first output from the video amplifier/multiplexer device is fed to the third connecting device and the video signal from the third connecting device is fed to the second connecting device.

6. Camera support device according to claim 4, wherein in the second transmitting mode, the video signal from a third output from the video amplifier/multiplexer device is fed to the first connecting device over one signal line of the remaining part of the several signal lines.

7. Camera support device according to claim 1, wherein at least one signal line of the several signal lines runs continuously between the first and second connecting devices.

8. Camera support device according to claim 1, wherein further connecting devices are provided for feeding/distributing electric power to the camera and/or to peripheral devices.

9. Camera support device according to claim 1, wherein at least one of the connecting devices is provided in duplicate.

10. Camera support device according to claim 1, wherein at least two of the connecting devices are connected to at least one additional signal line so that a sensor device can be connected by cable to one of the two connecting devices and a signal transmitting device can be connected by cable to the other one of the two connecting devices.

11. Camera support device worn on the body according to claim 1, wherein the peripheral device is at least one out of the group consisting of: a monitor, a video recording device and a transmitting device for video signal.

\* \* \* \* \*